United States Patent [19]

Lewis

[11] Patent Number: 5,577,491
[45] Date of Patent: Nov. 26, 1996

[54] HEAT TRAP FOR USE WITH HOT WATER HEATERS AND STORAGE SYSTEMS

[75] Inventor: Brian M. Lewis, Hamilton, Canada

[73] Assignee: Bemel Inc., Dundas, Canada

[21] Appl. No.: 311,583

[22] Filed: Sep. 23, 1994

[51] Int. Cl.⁶ ........................................................ F24H 1/00
[52] U.S. Cl. ............................ 126/362; 137/512; 137/854
[58] Field of Search ............................. 126/362; 137/512, 137/854

[56] References Cited

U.S. PATENT DOCUMENTS

| | | | |
|---|---|---|---|
| 3,144,904 | 8/1964 | Kahn et al. | 165/73 |
| 4,119,088 | 10/1978 | Sim | 126/413 |
| 4,286,573 | 9/1981 | Nickel | 126/362 |
| 4,633,853 | 1/1987 | Prill et al. | 126/362 |
| 4,964,394 | 10/1990 | Threatt | 126/361 |
| 5,277,171 | 1/1994 | Lannes | 126/362 |

Primary Examiner—Larry Jones

[57] ABSTRACT

A heat trap for hot water storage tanks is described and it comprises an outer tubular casing having opposed connecting end portions. The casing has an inner chamber which is divided to provide a convoluted water flow path. This convoluted water flow path can be provided by having concentric channels defined with the interior of the casing, or by having a member with two longitudinally spaced apart circular end walls joined by vanes extending radially from the central axis of the end walls. The first and second vanes have passages therein adjacent opposed ends. The opposed ends of the casing may also be a threaded tapered portion to connect the heat trap to threaded holes of different sizes depending on the make of the hot water tank.

19 Claims, 3 Drawing Sheets

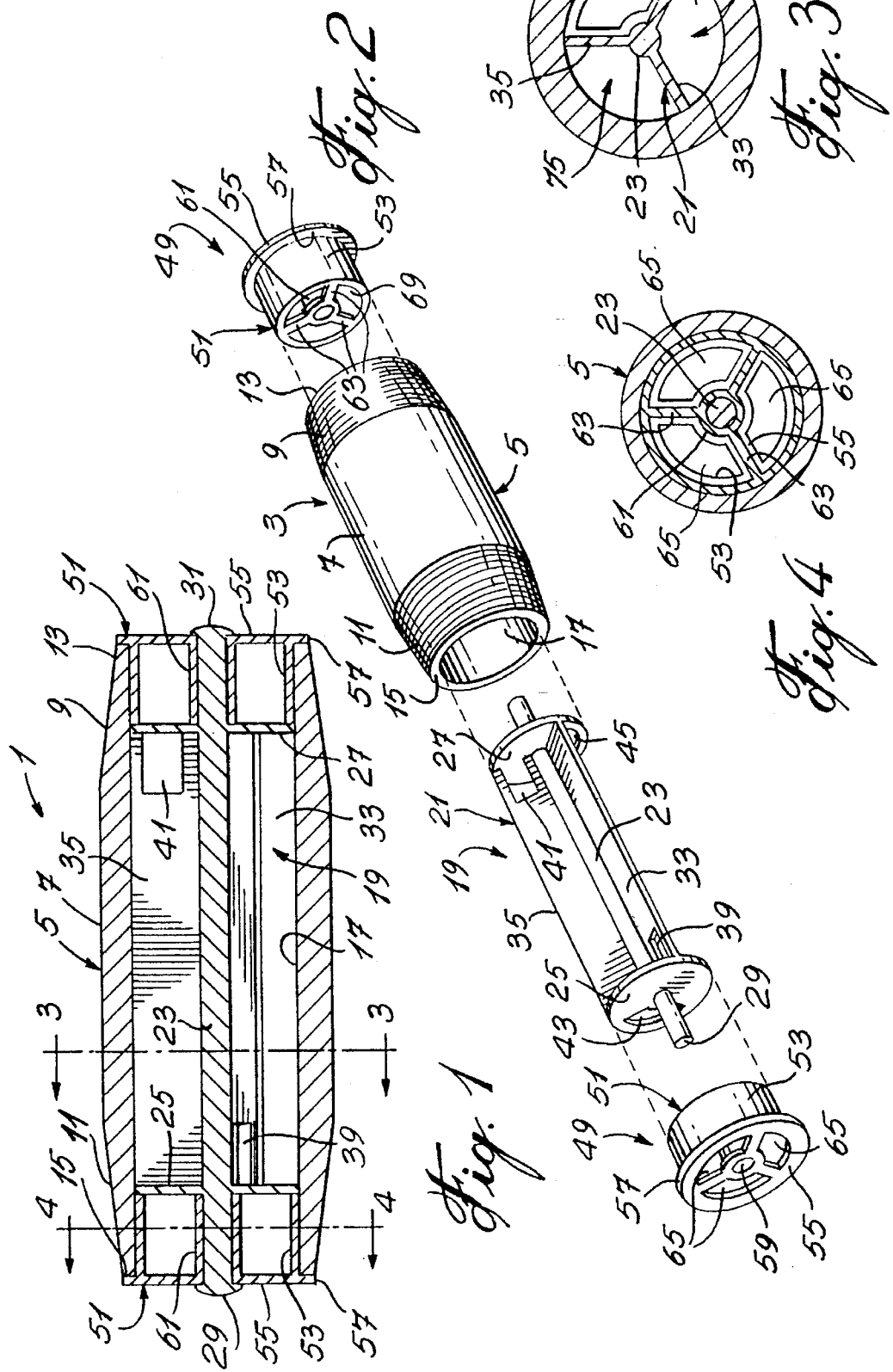

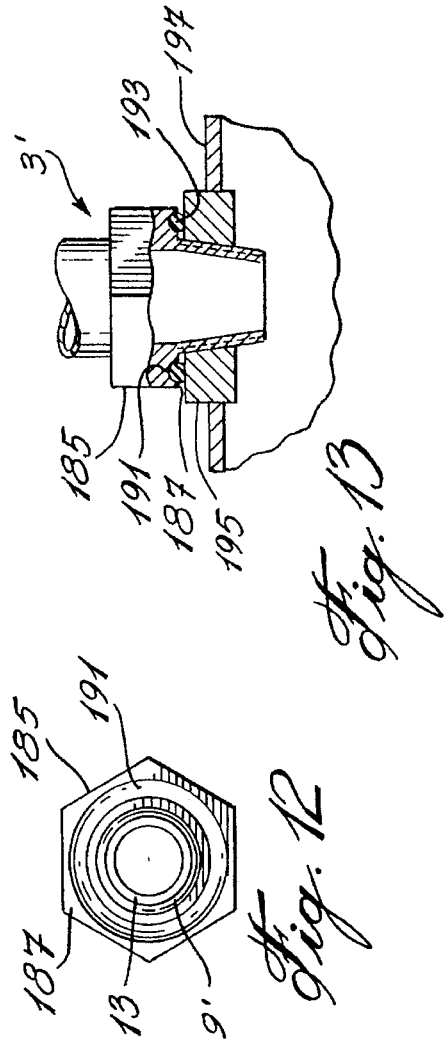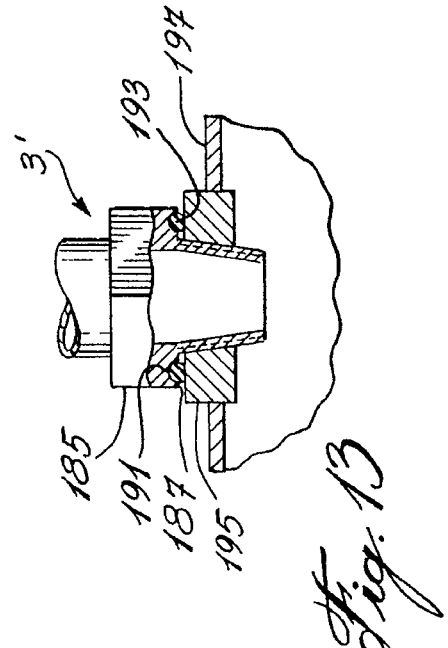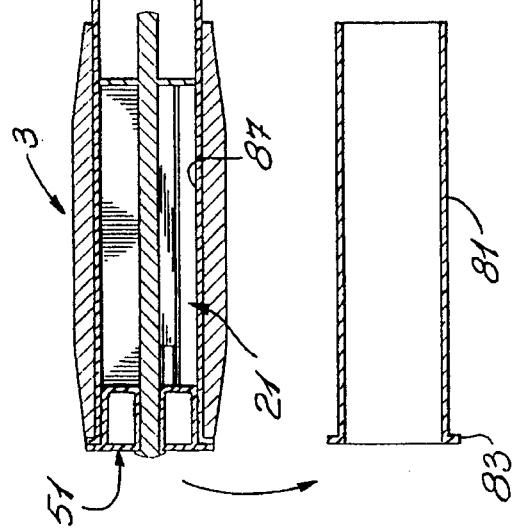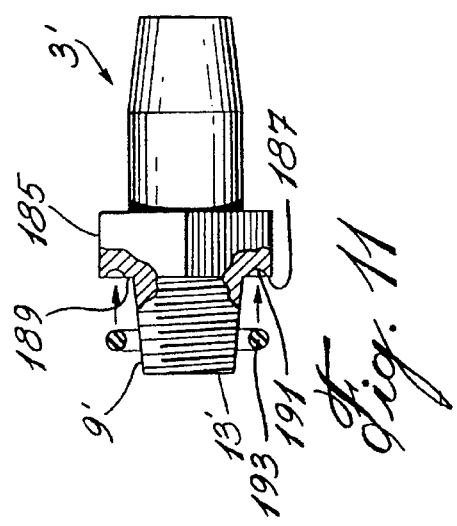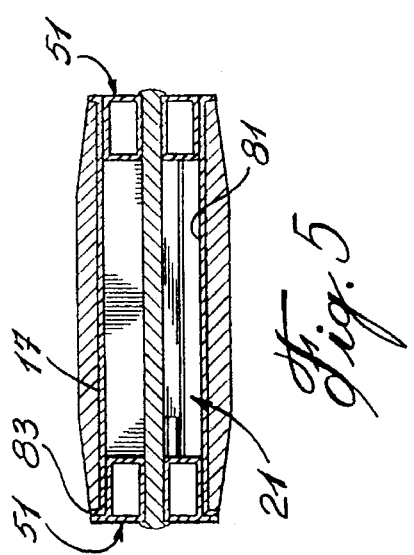

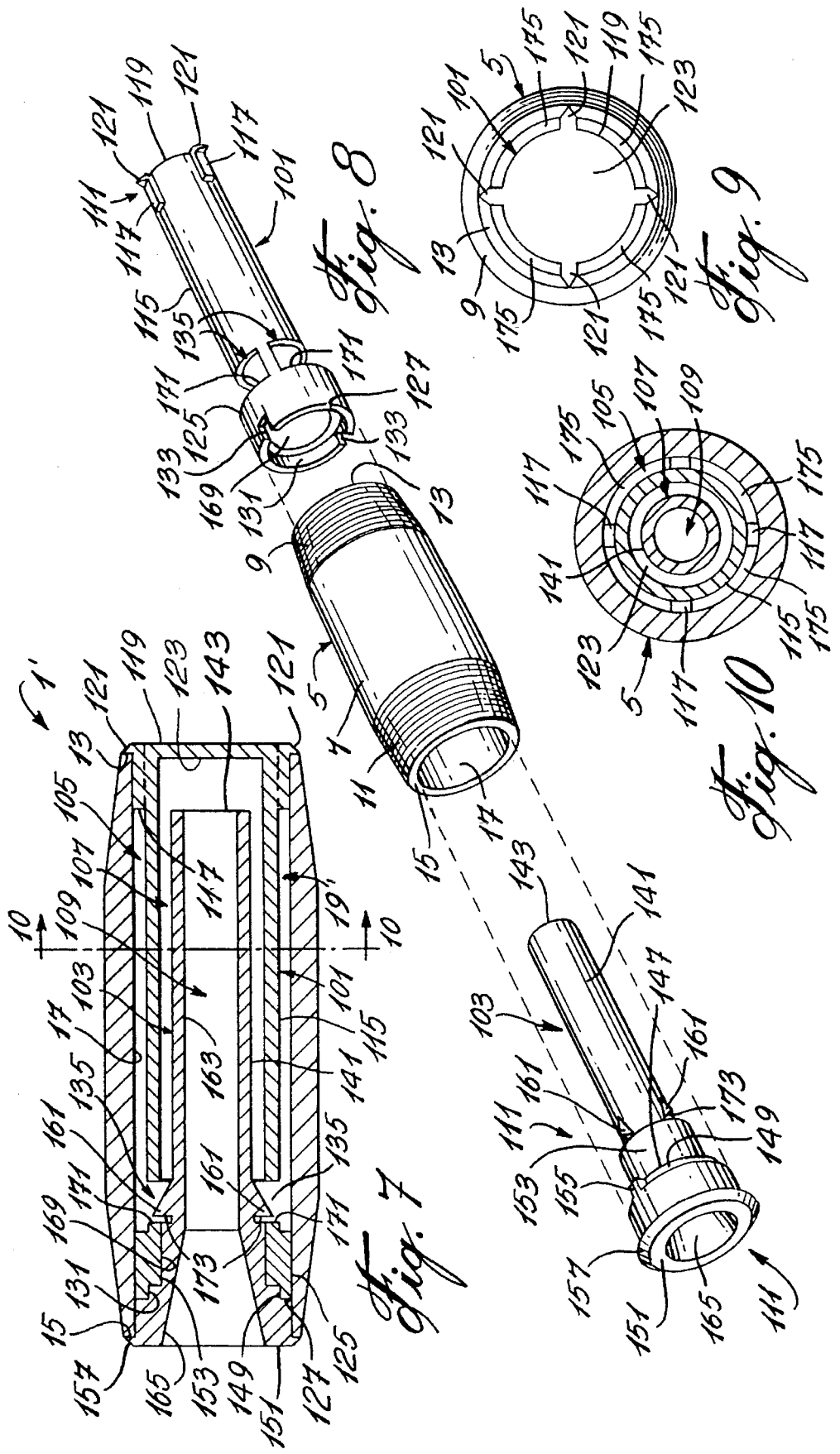

HEAT TRAP FOR USE WITH HOT WATER HEATERS AND STORAGE SYSTEMS

TECHNICAL FIELD

This invention relates to an improved heat trap for hot water storage tanks wherein the trap casing can be mounted from opposed ends and defines therein a convoluted water flow path.

BACKGROUND ART

Heat traps for hot water storage tanks are known. The traps are mounted at the outlet, and often at the inlet of the tank to minimize convection losses from the tank, when hot water is not being drawn off.

Many of the known traps, of which U.S. Pat. No. 4,286,573 is an example, employ a ball valve to prevent the convection losses. Such traps are however relatively expensive because of the number of parts employed. In addition, the valves can be mounted in only one specific manner if they are to be effective. To ensure that the valves are properly mounted, they must be suitably marked leading to additional cost, and even when marked, they could still be installed improperly. Ball valves also employ balls of different density depending on whether the valve is to be mounted on the outlet or inlet of the tank. Thus different valves are required for the different locations where it can be mounted on the tank, making the use of these valves still more expensive. Ball valves often have slits or openings in the seat of the valve to provide pressure relief. These slits or openings however can become blocked with sediment or deposits in hard water conditions. In addition, the slits or openings permit some convection losses, which losses the ball valves are supposed to minimize.

Other known heat traps employ no moving parts. Instead a convoluted water channel is provided within the trap with a portion of the channel allowing cooling of the water therein which cool water blocks the flow of warmer water from the tank. An example of such a trap is shown in U.S. Pat. No. 3,144,904. This type of trap is cheaper than a ball valve type since it has no moving parts. However these traps are to be mounted in one specific manner only and can usually be only used at the hot water outlet. In addition, these traps can usually be easily disassembled which can cause parts to be easily lost. Further, these traps usually have numerous sharp corners and crevices in the water channel that can lead to the trapping of sediment and deposits and eventual blockage of the trap.

SUMMARY OF INVENTION

It is a feature of the present invention to provide an improved heat trap of the type that employs a convoluted water channel. The improved heat trap has a minimum of parts with no moving parts. The improved heat trap can be mounted from either of its ends at any location on a water tank. The improved heat trap, once assembled, cannot be taken apart thus preventing the loss of any parts. The improved heat trap is designed for smooth flow to minimize the trapping of sediment and possible blocking of the trap. The improved trap, in one embodiment, is designed to accommodate a dip tube if desired. In another embodiment, the improved heat trap is designed to provide a better seal when mounted on the tank.

In accordance with one aspect of the present invention, the improved heat trap has an outer casing with identical ends. Thus either end can be used to mount the trap on a tank. Flow defining means are mounted within the casing. In one embodiment the flow defining means define adjacent water channels interconnected to form a convoluted water flow path. In another embodiment, the flow defining means define concentric water channels interconnected to form a convoluted water flow path. In either embodiment, the flow can be in either direction through the flow defining means. In both embodiments retaining means are provided for permanently retaining the flow defining means within the outer casing so that parts cannot be lost. In the embodiment employing adjacent water channels, means can be provided to accommodate a dip tube if desired. Either embodiment can employ a modified outer casing that has additional sealing means at one end to provide better sealing when mounted in place. It is understood that with this variation, better sealing is obtained at the expense of not being able to mount the trap from either end.

The invention, in one of its broader aspects, is particularly directed toward an improved heat trap having an outer tubular casing and flow defining means mounted within the casing. The outer casing has opposed, threaded, tapered end portions. The flow defining means defines, with the interior of the casing, a convoluted water flow path within the casing. Retaining means permanently mount the flow defining means within the casing.

In one embodiment, the flow defining means has adjacent water channels interconnected at their ends to form the convoluted water flow path. In another embodiment, the flow defining means has concentric water channels interconnected at their ends to form the convoluted water flow path.

BRIEF DESCRIPTION OF DRAWINGS

The invention will now be described in detail having reference to the accompanying drawings in which:

FIG. 1 is a longitudinal cross-sectional view of one embodiment of the heat trap;

FIG. 2 is an exploded view of the heat trap:

FIG. 3 is a cross section view taken along line 3—3 of FIG. 1;

FIG. 4 is a cross section view taken along line 4—4 of FIG. 1;

FIG. 4 is an exploded view of the heat trap;

FIG. 5 is a cross section view of the improved heat trap employing an interior sleeve:

FIG. 6 is a cross section view showing the heat trap of FIG. 5 equipped with a dip tube;

FIG. 7 is a cross section view of another embodiment of the improved heat trap;

FIG. 8 is an exploded view of the trap shown in FIG. 7:

FIG. 9 is a right end view of the trap shown in FIG. 7;

FIG. 10 is a cross section view taken along line 10—10 in FIG. 7:

FIG. 11 is a plan view, in partial section, of a modified heat trap;

FIG. 12 is a left hand end view of the trap shown in FIG. 11: and

FIG. 13 shows the trap of FIG. 11 mounted on a tank.

DESCRIPTION OF PREFERRED EMBODIMENTS

The improved heat trap 1, as shown in FIGS. 1 to 4, has an outer tubular casing 3. The outer surface 5 of the casing 3 has a cylindrical center portion 7 and tapered, threaded, end portions 9, 11 adjacent the ends 13, 15 of the casing. The inner surface 17 of the casing 3 is cylindrical between the ends 13, 15 of the casing.

Flow defining means 19 are provided within the casing 3. The flow defining means 19 form, with the inner surface of the casing 3, adjacent water channels, as will be described. The flow defining means 19 has a vaned member 21. The vaned member has a central post 23 with spaced-apart, circular, end walls 25, 27 mounted transversely on the post 23 and located a short distance in from the ends 29, 31 of the post. Three equally spaced apart vanes 33, 35, 37 extend radially from the post 23 between the end walls 25, 27. One vane 33 has a passage 39 therethrough adjacent one end wall 25. An adjacent vane 35 has a passage 41 therethrough adjacent the other end wall 27. An opening 43 is provided in the one end wall 25 between the vanes 35, 37 and an opening 45 is provided in the other end wall 27 between the vanes 33, 37. The vaned member 21 is molded in one piece and sized to fit snugly within the casing 3.

Retaining means 49 are provided in the heat trap 1 for permanently retaining the vaned member 21 within the casing 3. The retaining means 49 include end caps 51. Each end cap 51 has a cylindrical side wall 53 sized to fit snugly within the casing 3. A circular end wall 55 closes one side of the side wall 53. The end wall 55 is slightly larger in diameter than the side wall 53 to provide an overhanging flange portion 57. A central hole 59 is provided in the end wall 55. If desired, the end cap 51 can have a central tubular post 61 aligned with the hole 59 and extending inwardly from the end wall 55. Radial ribs 63 extend from the post 61 to the side wall 53 to reinforce the post 61. Openings 65 are provided in the end wall 55 between the ribs 63. An end cap 51 is then placed within the casing 3 at each end of the vaned member 21. The ends 29, 31 of the post 23 at each end of the vaned member 21 slide through the tubular post 61 on each cap 51 and just through the opening 59 in the end wall 55. One of the openings 65 in the end wall 55 of each end cap 51 is aligned with one of the openings 43, 45 in the end walls 25, 27 of the vaned member 21. The free edge of the cylindrical wall 53 of each end cap 51 abuts one of the end walls 25, 27 of the vaned member 21 at each end. The flange portion 57 of the end wall 55 of each end cap forms stop means preventing the caps from passing through the casing. The flange portion 57 abuts one of the ends 13, 15 of the casing 3. The projecting ends 29, 31 of the post 23 are now flattened against the end caps 51 by heat and pressure to securely and permanently mount the end caps 51 and the vaned member 21 within the casing 3.

When the heat trap 1 is assembled, the flow defining means 19 within the casing 3 defines a first water channel 73 formed between the vanes 33, 37 of the vaned member 21, the inner surface 17 of the casing, and the end walls 25, 27 of the vaned member as shown in FIG. 3. A second water channel 75, adjacent first water channel 73, is formed between the vanes 33, 35, inner surface 17, and end walls 25, 27. A third water channel 77, adjacent the other two water channels, is formed between the vanes 35, 37, the inner surface 17, and end walls 25, 27.

In use, the assembled heat trap can be mounted, by either end 13, 15, in either the outlet or inlet of a hot water tank or storage tank. Assuming that the trap is mounted by its end 13 in the outlet of a hot water tank, water will flow into the trap through the aligned openings 65 of the end cap 51, 45 in the end walls 27, and into first water channel 73. The water then flows in channel 73 in one direction from opening 45 to the passage 39 at the other end, through passage 39 into the second channel 75, back down passage 75 in the opposite direction to the passage 41, through passage 41 into the third channel 77, up channel 77 to the opening 43 in end wall 25 and out through an aligned opening 69 in the other end cap 51. During non-use of the water tank, the water in the second channel 75 cools and the hotter water in the first channel 73 cannot pass through this cooler water. Thus leakage of hot water from the water tank by convection is minimized. It will be seen that the heat trap will work no matter which end is connected to the tank. It will also be seen that the trap is relatively free of crevices and projections thus minimizing the collection of sediment and debris. The design of the trap, particularly the uniform, smooth shape of the inner surface 17 of the casing 3 allows the trap to be self cleaning in either direction of flow thus minimizing the chances of blockage. The trap always remains in one piece after it has been assembled for easy handling and eliminating the chance of losing any of its parts.

In one variation of the improved heat trap 1, the trap can be provided with a sleeve 81 snugly positioned between the inner surface 17 of the casing 3 and the vaned member 21 as shown in FIG. 5. The sleeve 81 is about as long as the casing 3. A flange 83 is provided at one end of the sleeve 81 to sit on one of the ends 13, 15 of the casing 3 when assembling the trap in order to properly position the sleeve. The flange 83 sits between the one end 13, 15 of the casing and the flange 57 of the end cap 51 at that end. The sleeve 81 has no function during operation of the trap. However, if the trap is to be combined with a dip tube, the sleeve 81 is removed to be replaced by the upper portion 87 of a much longer sleeve 85 as shown in FIG. 6. The short sleeve 81 provides the space needed for the long sleeve 85. This long sleeve 85 forms a dip tube. When a dip tube is used only one end cap 51 is used. In this embodiment, it will be obvious that the parts are not locked in place permanently and that the parts will have to be adjusted dimensionally to accommodate the sleeve.

In another embodiment of the invention, the heat trap can have flow defining means employing concentric water channels rather than adjacent water channels. As shown in FIGS. 7 to 10, this heat trap 1' has the same casing 3 as before. The flow defining means 19' however has two members, an intermediate sleeve 101 inserted into the casing 3 from one end 13, and an inner sleeve 103 inserted into the casing 3 from its other end 15. The intermediate sleeve 101 is spaced from the inner surface 17 of the casing to define a first water channel 105. The inner sleeve 103 is positioned within the intermediate sleeve 101 and spaced therefrom to define a second water channel 107. The interior of the inner sleeve 103 defines a third water channel 109. It will be seen that the three channels 105, 107 and 109 are concentric.

Retaining means 111 are provided for permanently retaining the intermediate and inner sleeves 101, 103 within the casing 3. The retaining means can comprise flanges on the outer ends of the two sleeves that abut the ends of the casing, and cooperating interlocking means on the two sleeves that prevent them from moving away from each other once they have been interlocked within the casing.

In more detail, the intermediate sleeve 101 has a tubular, cylindrical body 115 with spacer bars 117 on its outer surface adjacent one end 119. The spacer bars 117, four shown, are equally spaced about the outer surface of the body 115, and extend parallel to the axis of the body. The spacer bars 117 are relatively short and fit snugly within the casing 3. Flanges 121 extend radially outwardly from the spacer bars 117 to abut against the one end 13 of the casing 3 when the sleeve is mounted within the casing. The one end 119 of the sleeve 101 is closed with an end wall 123. There is an enlarged cylindrical portion 125 at the other end 127 of the body 115. This enlarged portion 125 also fits snugly within the casing 3 adjacent the other end 15 of the casing. Both the spacer bars 117 and the enlarged cylindrical portion 125 serve to space the body 115 of the sleeve 101 from the inner surface 17 of the casing 3 to form the first water channel 105. The enlarged portion 125 of the sleeve 101 is countersunk part way in from the end 127 as shown at 131. The wall of the sleeve that is countersunk has two opposed locating slots 133 extending in from the end 127. Two opposed passageways 135 are formed in the wall of the body 115 adjacent the enlarged portion 125.

The inner sleeve 103 has a tubular, cylindrical body 141 with a free end 143. There is an enlarged, cylindrical portion at the other end 151 of the sleeve joined to the body 141. The cylindrical portion is stepped as shown at 147 forming a large cylindrical portion 149 adjacent the other end 151 of the sleeve and a smaller cylindrical portion 153 adjacent the body 141. Two opposed rectangular tabs 155 are provided on the surface of the large portion 149 extending longitudinally inwardly from the end 151 of the sleeve. A flange 157 extends radially outwardly from the end 151 of the sleeve past the large portion 149. Interlocking means in the form of a pair of opposed tapered tabs 161 are provided on the inner sleeve 103. The tabs 161 extend radially outwardly from the body 141 adjacent the small portion 153. The tabs 161 taper inwardly in moving away from the small portion 153 and project outwardly just past the small portion 153. The longitudinal hole 163 through the sleeve 103 forms the third channel 109. The end of the hole 163 adjacent the end 151 of the sleeve 103 can be tapered outwardly as shown at 165 to form water opening means for the trap.

The heat trap 1' is assembled by inserting the intermediate sleeve 101 into the casing 3 from one end 13 of the casing and the inner sleeve 103 into the casing from its other end 15. The intermediate sleeve 101 is pushed in until its flanges 121 at its end 119 abut the end 13 of the casing 3. The spaces between the spacer bars form water opening means for the trap. The inner sleeve 103 is pushed in until its flange 157 abuts the inner end 15 of the casing. As the sleeves are being pushed in, from opposite ends of the casing, the body 141 of the inner sleeve 103 enters the body 115 of the intermediate sleeve 101. Also, the tapered tabs 161 on the inner sleeve 103 are pushed past the inner surface 169 of the enlarged portion 125 of the intermediate sleeve 101. The tabs 161 are slightly resilient allowing them to flex slightly to pass by the inner surface 169. As soon as the tabs 161 pass the inner surface 169 and reach the passageways 135 they straighten out. This happens just before the flanges 121, 157 abut on the ends 13, 15 of the casing. The sharp edges 171 defining the passageways 135 act as a stop against the straight edge 173 of the tabs 161 preventing the tabs from moving rearwardly. Thus the tapered tabs 161 and the edges 171 of the passageways 135 form cooperating locking means to retain the parts in their assembled positions. The flanges 121, 157 prevent the sleeves from passing through the casing.

When assembled, the small portion 153, on the inner sleeve 103, fits snugly within the inner surface 169 on the intermediate sleeve 101 and the large portion 149, on the inner sleeve 103, fits snugly within the countersunk portion 131 on the intermediate sleeve 101 to center the body 141 of the inner sleeve within the intermediate sleeve 101. The free end 143 of the inner sleeve 103 ends slightly in front of the end wall 123 of the intermediate sleeve 101. The slots 133 on the intermediate sleeve 101 serve as a guide to receive the tabs 155 on the inner sleeve 103. When the tabs 155 are received by the slots 133 it ensures that the tapered tabs 161 will enter the passageways 135.

When the heat trap 1' is assembled it can be mounted on a hot water tank by either end. Assuming that the end 13 of the casing 3 is mounted on the tank, the water flows into the trap through the openings 175 between the spacers 117 and along the first channel 105 to the passageways 135. The water flows through the passageways 135 into the second channel 107 and along the second channel in the opposite direction to the flow in the first channel to the end of the inner sleeve 103. The water then flows around the free end 143 of the inner sleeve and into the third channel 109 through the inner sleeve 103 and out of the enlarged opening 165. As before, the water in the second channel, as it cools, prevents the hot water in the first channel from advancing. It will be obvious that the trap can be mounted with its other end in the tank and that it will work equally as well.

The outer casing 3 can be modified if desired to employ sealing means to provide a better seal when the heat trap is mounted in the tank. To this end a casing 3' can be provided, as shown in FIGS. 11 to 13, with an enlargement 185 spaced from one end 13' of the casing. The enlargement 185 has a shoulder 187 near the end 189 of the tapered threaded portion 9' of the casing. A groove 191 is provided in the shoulder 187 to receive an O-ring 193. When the tapered end 9' of the casing 3' is screwed into the fitting 195 on the tank 197, the O-ring 193 abuts against the tank wall around the fitting 195 to provide additional sealing. The enlargement 185 can be hexagonal shaped to receive a wrench to make it easier to tighten the trap.

The improved sealing means and the hexagonal enlargement could be employed with most other heat traps as well.

The modified heat trap as shown in FIGS. 11 to 13 can also be used as part of the trap body and also as a separate entity may be used as a spacer where needed when there is foam insulation about the hot water storage tank.

I claim:

1. An improved heat trap for hot water storage system, said heat trap comprising an outer tubular casing, said casing having opposed, threaded, tapered, end portions; flow defining means mounted within said casing and defining, with the interior of the casing, a convoluted water flow path; and means for permanently retaining the flow defining means within the casing, said flow defining means having adjacent channels defining, with the interior of said casing, the water flow path, said flow defining means further having a member having two longitudinally spaced apart circular end walls, said end walls joined by three vanes extending radially from the central axis of said end walls, a first vane having a passage therein adjacent one of said end walls, and a second adjacent vane having a passage therein adjacent the other of said end walls.

2. An improved heat trap as claimed in claim 1 wherein said casing has a cylindrical inner surface between the ends of said casing.

3. An improved heat trap as claimed in claim 1 wherein said casing has a cylindrical inner surface between the ends of said casing, the flow defining means having concentric channels defining, with the interior of said casing, said water flow path.

4. An improved heat trap as claimed in claim 1 wherein said one of said end walls has an opening aligned with the space between said second and third vanes and said other of said end walls has an opening aligned with the space between said first and third vanes.

5. An improved heat trap as claimed in claim 4 wherein said retaining means comprise end caps insertable into each end of said casing to retain said flow defining means between them.

6. An improved heat trap as claimed in claim 5 wherein said end caps each have stop means bearing against an end of said casing, and means are provided for permanently attaching said end caps to said flow defining means while said stop means bear against said casing.

7. An improved heat trap as claimed in claim 5 wherein said end caps each have at least one opening aligned with said opening in said end wall of the flow defining means that is adjacent to it.

8. An improved heat trap as claimed in claim 1 including a sleeve about as long as said casing, mounted between said casing and said flow defining means.

9. An improved heat trap as claimed in claim 8 wherein said sleeve can be replaced by a much longer sleeve forming a dip tube, said retaining means being modified to retain said flow defining means within said casing from one end only.

10. An improved heat trap as claimed in claim 1 wherein said casing has an enlargement with a shoulder on said enlargement facing said one end of said casing, said shoulder having a circular groove to mount an O-ring therein.

11. An improved heat trap as claimed in claim 10 wherein said enlargement has a hexagonal cross sectional shape.

12. An improved heat trap as claimed in claim 1 wherein said storage system is a hot water storage tank.

13. An improved heat trap for hot water storage system, said heat trap comprising an outer tubular casing, said casing having opposed, threaded, tapered, end portions; flow defining means mounted within said casing and defining, with the interior of the casing, a convoluted water flow path; and means for permanently retaining the flow defining means within the casing, said flow defining means having concentric channels defining, with the interior of said casing, said water flow path; said flow defining means further having an intermediate sleeve mounted within said casing from one end of said casing and an inner sleeve mounted within said intermediate sleeve from the other end of said casing, abutment means on the outer end of said intermediate sleeve for abutting against the said one end of said casing, abutment means on said outer end of said inner sleeve for abutting against the said other end of said casing, and interlocking means on said sleeves for interlocking them together within said casing to prevent their withdrawal from said casing.

14. An improved heat trap as claimed in claim 13 wherein a portion of said intermediate sleeve is spaced from said casing to form a first channel, a portion of said inner sleeve being spaced from said intermediate sleeve to form a second channel, and said interior of said inner sleeve forms a third channel.

15. An improved heat trap as claimed in claim 14 including one opening means for said first channel at one end of said casing and other opening means for said third channel at the other end of said casing, and means connecting said first, second and third channels together to have water flow between said two openings in said channels in a convoluted path.

16. An improved heat trap as claimed in claim 13 wherein said casing has a cylindrical inner surface between the ends of said casing.

17. An improved heat trap as claimed in claim 13 wherein said casing has an enlargement with a shoulder on said enlargement facing said one end of said casing, said shoulder having a circular groove to mount an O-ring therein.

18. An improved heat trap as claimed in claim 17 wherein said enlargement has a hexagonal cross sectional shape.

19. An improved heat trap as claimed in claim 13 wherein said storage system is a hot water storage tank.

* * * * *